INVENTOR.
Milton O. Reeves,
BY
Hood + Hahn.
ATTORNEYS

Nov. 13, 1928.
M. O. REEVES
DRIVING BELT
Filed July 23, 1924
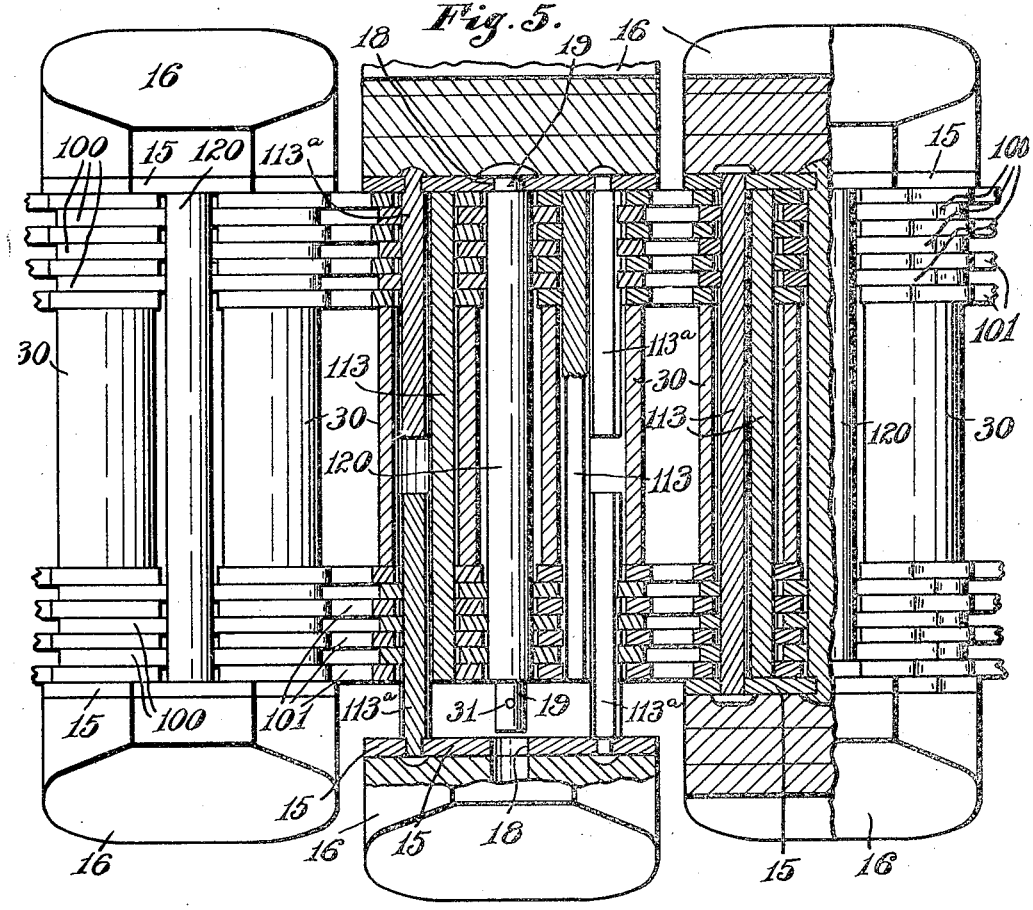
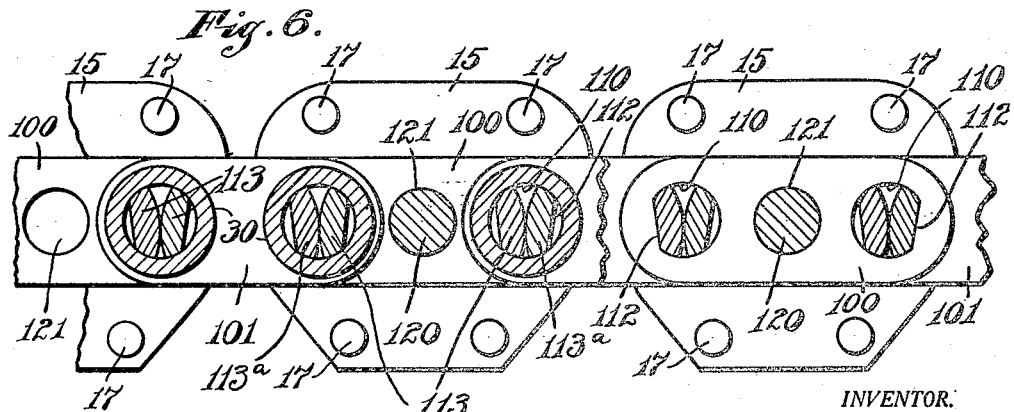
INVENTOR.
Milton O. Reeves,
BY
Hood + Hahn.
ATTORNEYS Patented Nov. 13, 1928.

1,691,871

UNITED STATES PATENT OFFICE.

MILTON O. REEVES, OF COLUMBUS, INDIANA; PAUL B. REEVES, ADMINISTRATOR DE BONIS NON OF SAID MILTON O. REEVES, DECEASED, ASSIGNOR TO REEVES PULLEY COMPANY, OF COLUMBUS, INDIANA, A CORPORATION OF INDIANA.

DRIVING BELT.

Application filed July 23, 1924. Serial No. 727,838.

In that type of speed variating transmissions commonly known in the market for many years as the "Reeves", the driving force is delivered from the driving shaft to the driven shaft through the medium of two pairs of cone disks and an intermediate driving belt effective along its edges. Heretofore this driving belt has been an endless flexible band usually of woven fabric having secured thereto transverse bars having inclined leatherfaced ends. Belts of this character have been quite satisfactory but they nevertheless give considerable trouble because of breakage.

The object of my present invention is to produce an improved driving belt of the above type formed of metal, or other suitable links and possessing greater strength and longer life than belts heretofore used for that purpose.

It will of course be understood that while my improved belt has been particularly designed for use in the Reeves speed varying transmission, it will nevertheless be useful in any form where the driving forces are applied edgewise to the belt.

The accompanying drawings illustrate my invention.

Figure 1:
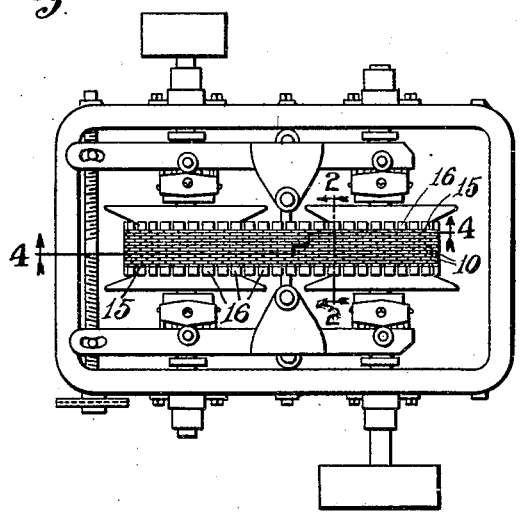
Figure 2:
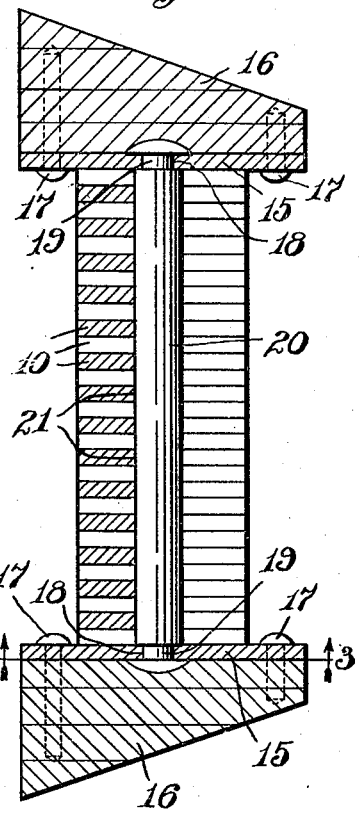
Figure 3:
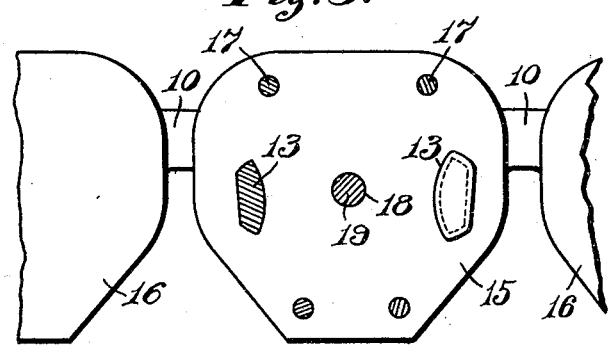
Figure 4:
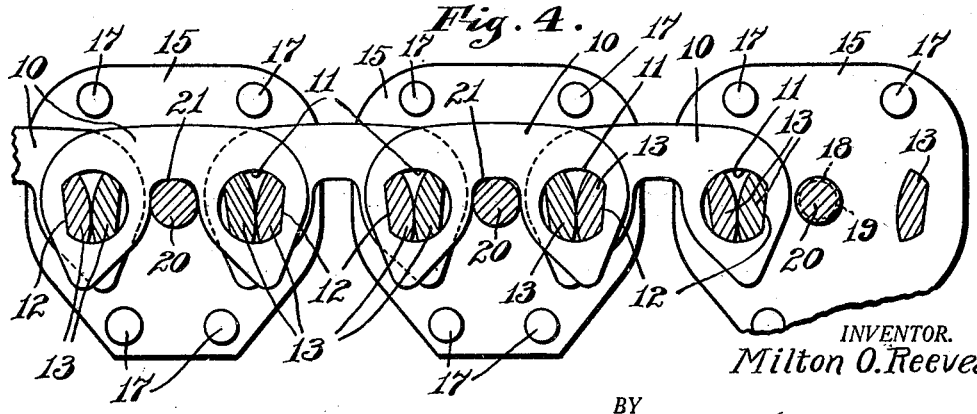

Fig. 1 is a plan of a Reeves transmission equipped with my improved belt;

Fig. 2 a transverse section on line 2—2 of Fig. 1, on a larger scale;

Fig. 3 a longitudinal section on line 3—3 of Fig. 2;

Fig. 4 a longitudinal section of the belt on line 4—4 of Fig. 1, but on a larger scale;

Fig. 5 a longitudinal section, on a plane at right angles to the plane of Fig. 4, of a belt embodying my invention but slightly modified from the form shown in Fig. 2, and showing also an improved connection by which the belt may be separated at one point, and Fig. 6 is a longitudinal section on a plane at right angles to the plane of Fig. 5.

In Figures 2, 3 and 4 I have shown a belt embodying my invention but produced from a well known and common type of "silent" chain formed of a plurality of interdigitated transverse series of links 10 each of which is perforated, near each end, by a perforation 11 mostly circular but flattened at 12, at one side adjacent the adjacent end of the link, the construction being such that the flattened portions 12 of two interdigitated series of links will lie upon opposite sides of the common axes of the perforations 11 of the two sets of links, two rocker pins 13—13 being projected through the perforations 11 with their curved faces in contact with each other and their flattened bases seated respectively upon the flattened portions 12 of the appropriate series of links, thus forming a rocking connection between the two interdigitated series of links.

In a belt of this character alternate transverse series of links will contain one more link than the two adjacent series, in order to produce a belt giving the appearance of uniform width, and for my purpose these outer links 15 of alternate transverse series are special plates of increased area and to the outer faces of these plate links 15 I secure suitably tapered friction blocks 16 conveniently formed of leather cemented upon the outer faces of plates 15 and additionally held in place by dowel pins 17 projected through plate 15 into block 16 and conveniently held therein by cement.

The co-action between a belt of the type under consideration and a pair of driving or driven cones contacted by the belt subjects the belt to a heavy transverse pinching stress which would, if unopposed, pinch the interdigitated links together with such force as to seriously interfere with the necessary bending of the belt. For the purpose of resisting this pinching stress and for the further purpose of so connecting the various links composing the belt that all links receive the longitudinal stresses, so that the longitudinal stresses will not act solely as shearing stresses at the ends of rockers 13, immediately adjacent the outer links or plates 15, I perforate the plate links 15 medially at 18 to receive the shouldered ends 19 of bridge rods 20, each of which forms a bridge between two opposite plates 15 and I so form rod 20 that it will nest snugly in the notches 21 of those links 10 which lie between link plates 15, thereby tying into a single unit, which may be termed a "pressure bar", two outer links 15, each with its end friction face, two rocker bars 13, an intermediate series of links 10, and a bridge rod 20, the bridge rod 20 serving not only to resist the pressures applied endwise to the friction faces, thus preventing collapse of the transverse series of links 15 and intermediate links 10, but also, due to their engagement with the links 10 in a direction lengthwise or longitudinally of the belt, serving to transmit, to the intermediate links 10, those stresses applied to the friction faces and acting longitudinally of the belt.

It will be readily understood that forms of connections between interdigitated series of links other than the rocker bar form shown in the drawings may be adopted without departing from my invention.

It will also be understood that the peculiar notched form of link 10 shown in Fig. 4 is merely the form which is commonly used in the so called "silent" chain and that the form of these intermediate links may be changed without departing from my invention. For instance, in Fig. 6 I show links 100 perforated at 110 having flattened faces 112 to receive rocker bars 113, these links being medially perforated at 121 to receive the bridge rod 120, this bridge rod fitting snugly in perforations 121 and thus unifying the intermediate links 100 with the plate links 15.

It is of course, quite desirable that the plates 15, and the friction block 16 carried thereby have as great a longitudinal extent as possible, in order to give a maximum friction face for each "pressure bar" and therefore, in Figs. 5 and 6, I have shown links 100 somewhat longer than the interdigitated connecting links 101.

It will also be understood that a metal link belt of the character described, and of a width equal to the width of a fabric belt, would produce a belt of very considerably greater strength than the fabric belt and therefore, in order to adapt my invention to use in existing Reeves transmissions where the necessary length of a "pressure bar" is determined by the other dimensions of the apparatus, I provide a belt of the construction shown in Fig. 5 consisting of two edge series of interdigitated links separated by tubular spacers 30 which are sleeved over the intermediate portions of the rocker bars 13.

In order that my improved belt may be readily separated, to permit removal from the cones, I provide the construction shown at the middle of Fig. 5. Bridge rod 120 is only riveted to one of plates 15, its other end having a sliding shouldered connection at perforation 18 of the other plate 15. Short sections of rocker bars 113ª, having lengths approximately equal to half the width of the belt, are riveted in pairs to plates 15 and are projected into perforations 110 from each end. In belts of this type there is no force which would tend normally to produce movement of plates 15 outwardly laterally of the belt and even if there were these plates would be driven inwardly each time their friction faces engaged the driving or driven cones and consequently there is no need of provision of any retaining means, although such retaining means may be readily provided by perforating the shouldered end of bridge rod 120, at 31, for the reception of a retaining wire or pin (not shown). The rocker bars 113 which co-operate with rocker bars 113ª are retained in place endwise by the outer plates or links 15 of what I have termed the "pressure bar". Consequently, in order to separate the belt, it is merely necessary to draw the two plate links 15 (at the point illustrated in the middle of Fig. 5) outwardly away from the belt. One of the co-operating rocker bars 113 may then be withdrawn, whereupon the interdigitated links, at this point, may be separated.

It will of course be understood that I have specifically described my invention in connection with the particular type of link belt and connecting rocker bar pivots illustrated in the drawings, but that the invention is by no means limited to such specific form of connection between the successive links of the belt. It is to be understood, therefore, that the term "pressure bar" as I have used it in the claims is to be interpreted as defining a link element of a belt, which is to receive power applied edgewise to the belt, comprising two end faces, to which the driving force may be applied, an intermediate portion between these faces with which connecting links may be pivotally associated, said intermediate portion being capable of withstanding the pinching stress to such an extent that said stress will not interfere with proper pivotal movement of the interdigitated links, and elements carried by said intermediate portion for the pivotal association with the interdigitated links.

I claim as my invention:

1. A drive belt comprising a plurality of pressure bars each consisting of a plurality of links and a centrally located bridge rod extending between the outer links and engaging the same to limit approach of said outer links and passing through the intermediate links laterally of the bar, connecting series of links between and interdigitated with links of adjacent pressure bars, and means connecting the pressure bar links and interdigitated links.

2. A drive belt comprising a plurality of pressure bars each consisting of a plurality of links and a centrally located bridge rod extending between the outer links and engaging the same to limit approach of said outer links and passing through the intermediate links laterally of the bar, connecting series of links between and interdigitated with links of adjacent pressure bars, and means connecting the pressure bar links and interdigitated links, said means comprising pairs of rocker bars having a rocking engagement with each other, projected through two sets of links at the interdigitation and each rocker bar having a non-rocking association with one set of links.

3. A drive belt comprising a pressure bar formed of two end links, a series of intermediate links, and a bridge bar extending between the end links and through the intermediate links and being readily separable from one end link and the intermediate links, series of connector links interdigitated with the pressure bar links, a rocker bar nonrotatively associated with said series of interdigitated links and extending through the pressure bar links rotatively, and a second rocker bar non-rotatively associated with the pressure bar links and rotatively projected through the interdigitated links and rockingly associated with the first mentioned rocker bar, said second mentioned rocker bar being independent of one of the end links of its pressure bar.

4. In a drive belt, a pressure bar comprising two end plates having force-receiving outer faces, a plurality of intermediate laterally spaced links, a bridge rod spacing the two outer links and separably projected through the intermediate links, and two pairs of rocker bars carried by the end plates and separably projected into the intermediate links; two series of connector links interdigitated with the pressure bar links, and two rocker bars projected through the pressure links and interdigitated links and co-operating with the rocker bars of the pressure links, one of said last mentioned two rocker bars being separably associated with the links through which it is projected.

5. In a drive belt a pressure bar comprising two end plates having force-receiving outer faces, a plurality of intermediate laterally spaced links, a bridge rod spacing the two outer links and separably projected through the intermediate links, and two pairs of pins carried by the end plates and separably projected into the intermediate links, two series of connector links interdigitated with the pressure bar links, and elements associated with the pins for completing a pivotal association between the pressure bar links and the interdigitated links.

6. In a drive belt a pressure bar comprising two end plates having force-receiving outer faces, a plurality of intermediate laterally spaced links, a centrally located bridge rod spacing the two end plates and passing through the intermediate links laterally of the bridge rod.

7. In a drive belt a pressure bar comprising two end plates having force-receiving outer faces, a plurality of intermediate laterally spaced links, a centrally located bridge rod spacing the two end plates and passing through the intermediate links laterally of the bridge rod, two series of links interdigitated with the pressure bar links and means for pivotally connecting said pressure bar links and interdigitated links, said means comprising two pins each carried by an end plate and movable relative to the other and separably co-related with the other links.

In witness whereof, I, MILTON O. REEVES, have hereunto set my hand at Indianapolis, Indiana, this 11th day of July, A. D., 1924.

MILTON O. REEVES.